A

United States Patent
Parlour et al.

(10) Patent No.: US 8,402,164 B1
(45) Date of Patent: Mar. 19, 2013

(54) ASYNCHRONOUS COMMUNICATION NETWORK AND METHODS OF ENABLING THE ASYNCHRONOUS COMMUNICATION OF DATA IN AN INTEGRATED CIRCUIT

(75) Inventors: David B. Parlour, Pittsburgh, PA (US); Jorn W. Janneck, San Jose, CA (US); Ian D. Miller, Raleigh, NC (US)

(73) Assignee: Xilinx, Inc., San Jose, CA (US)

( * ) Notice: Subject to any disclaimer, the term of this patent is extended or adjusted under 35 U.S.C. 154(b) by 351 days.

(21) Appl. No.: 12/913,626

(22) Filed: Oct. 27, 2010

(51) Int. Cl.
*G06F 15/16* (2006.01)
(52) U.S. Cl. .......... 709/238; 709/251; 370/258
(58) Field of Classification Search .......... 709/200–202, 709/238, 250–251; 370/222–224, 258
See application file for complete search history.

(56) References Cited

U.S. PATENT DOCUMENTS

| | | | |
|---|---|---|---|
| 5,115,437 A * | 5/1992 | Welles et al. | 714/733 |
| 5,126,975 A | 6/1992 | Handy et al. | |
| 5,208,491 A | 5/1993 | Ebeling et al. | |
| 5,367,209 A | 11/1994 | Hauck et al. | |
| 5,513,132 A | 4/1996 | Williams | |
| 5,657,465 A * | 8/1997 | Davidson et al. | 712/201 |
| 5,829,007 A | 10/1998 | Wise et al. | |
| 5,999,961 A | 12/1999 | Manohar et al. | |
| 6,140,836 A | 10/2000 | Fujii et al. | |
| 6,150,838 A | 11/2000 | Wittig et al. | |
| 6,184,712 B1 | 2/2001 | Wittig et al. | |
| 6,208,163 B1 | 3/2001 | Wittig et al. | |
| 6,208,644 B1 * | 3/2001 | Pannell et al. | 370/389 |
| 6,225,827 B1 | 5/2001 | Fujii et al. | |
| 6,308,229 B1 | 10/2001 | Masteller | |
| 6,320,418 B1 | 11/2001 | Fujii et al. | |
| 6,369,614 B1 | 4/2002 | Ridgway | |
| 6,476,643 B2 | 11/2002 | Hugues et al. | |
| 6,486,709 B2 | 11/2002 | Sutherland et al. | |
| 6,522,170 B1 | 2/2003 | Durham et al. | |
| 6,531,897 B1 | 3/2003 | Milshtein et al. | |
| 6,590,424 B2 | 7/2003 | Singh et al. | |
| 6,708,193 B1 | 3/2004 | Zeng | |
| 6,850,092 B2 | 2/2005 | Chelcea et al. | |
| 6,949,954 B2 | 9/2005 | Nystrom et al. | |
| 6,958,627 B2 | 10/2005 | Singh et al. | |
| 6,959,315 B2 | 10/2005 | Chren, Jr. | |
| 6,990,510 B2 | 1/2006 | Friend et al. | |
| 7,050,324 B2 | 5/2006 | Cummings et al. | |
| 7,053,665 B2 | 5/2006 | Singh et al. | |
| 7,157,934 B2 | 1/2007 | Teifel et al. | |

(Continued)

OTHER PUBLICATIONS

U.S. Appl. No. 12/417,007, filed Apr. 2, 2009, Young et al.

(Continued)

*Primary Examiner* — Moustafa M Meky
(74) *Attorney, Agent, or Firm* — John J. King

(57) ABSTRACT

An asynchronous communication network in an integrated circuit is described. The asynchronous communication network comprises a plurality of circuit elements enabling the transmission of tokens, each circuit element having a component interface comprising: a routing network coupled to a first adjacent circuit element of the plurality of circuit elements; and a control circuit coupled to the routing network, the control circuit having a first input coupled to receive a first command requesting a detection of a token received at a second input of the control circuit, and a first acknowledgement output coupling a first acknowledgement signal indicating whether the first command is received at the first input. Methods of enabling asynchronous communication in an integrated circuit are also disclosed.

20 Claims, 10 Drawing Sheets

U.S. PATENT DOCUMENTS

| | | | |
|---|---|---|---|
| 7,196,543 | B1 | 3/2007 | Young et al. |
| 7,202,698 | B1 | 4/2007 | Bauer et al. |
| 7,274,211 | B1 | 9/2007 | Simkins et al. |
| 7,308,627 | B2 | 12/2007 | Schultz et al. |
| 7,352,204 | B2 | 4/2008 | Frisch |
| 7,375,552 | B1 | 5/2008 | Young et al. |
| 7,417,456 | B2 | 8/2008 | Verma et al. |
| 7,450,606 | B2 * | 11/2008 | Cao .............................. 370/450 |
| 7,467,175 | B2 | 12/2008 | Simkins et al. |
| 7,467,177 | B2 | 12/2008 | Simkins et al. |
| 7,472,155 | B2 | 12/2008 | Simkins et al. |
| 7,480,690 | B2 | 1/2009 | Simkins et al. |
| 7,504,851 | B2 | 3/2009 | Manohar et al. |
| 7,505,304 | B2 | 3/2009 | Manohar et al. |
| 7,538,579 | B1 | 5/2009 | Schleicher et al. |
| 7,605,604 | B1 | 10/2009 | Young |
| 7,609,085 | B1 | 10/2009 | Schmit et al. |
| 7,635,989 | B1 | 12/2009 | Young |
| 7,652,498 | B2 | 1/2010 | Hutchings et al. |
| 7,701,254 | B2 * | 4/2010 | Chow et al. ..................... 326/93 |
| 7,743,175 | B1 | 6/2010 | Young et al. |
| 7,746,101 | B1 | 6/2010 | Young |
| 7,746,102 | B1 | 6/2010 | Young et al. |
| 7,746,103 | B1 | 6/2010 | Gaide et al. |
| 7,746,104 | B1 | 6/2010 | Gaide et al. |
| 7,746,105 | B1 | 6/2010 | Gaide et al. |
| 7,746,106 | B1 | 6/2010 | Gaide et al. |
| 7,746,108 | B1 | 6/2010 | Young et al. |
| 7,746,109 | B1 | 6/2010 | Young et al. |
| 7,746,110 | B1 | 6/2010 | Gaide et al. |
| 7,746,111 | B1 | 6/2010 | Gaide et al. |
| 7,746,112 | B1 | 6/2010 | Gaide et al. |
| 7,746,113 | B1 | 6/2010 | Young |
| 7,759,974 | B1 | 7/2010 | Young |
| 2003/0055852 | A1 | 3/2003 | Wojko |
| 2004/0044716 | A1 | 3/2004 | Colon-Benet |
| 2004/0257993 | A1 * | 12/2004 | Lysne et al. ................... 370/230 |
| 2005/0127944 | A1 | 6/2005 | Lewis et al. |
| 2005/0144210 | A1 | 6/2005 | Simkins et al. |
| 2006/0164119 | A1 | 7/2006 | Nowak-Leijten |
| 2006/0190516 | A1 | 8/2006 | Simkins et al. |
| 2006/0195496 | A1 | 8/2006 | Vadi et al. |
| 2006/0206557 | A1 | 9/2006 | Wong et al. |
| 2006/0212499 | A1 | 9/2006 | New et al. |
| 2006/0230092 | A1 | 10/2006 | Ching et al. |
| 2006/0230093 | A1 | 10/2006 | New et al. |
| 2006/0230094 | A1 | 10/2006 | Simkins et al. |
| 2006/0230095 | A1 | 10/2006 | Simkins et al. |
| 2006/0230096 | A1 | 10/2006 | Thendean et al. |
| 2006/0288069 | A1 | 12/2006 | Simkins et al. |
| 2006/0288070 | A1 | 12/2006 | Vadi et al. |
| 2006/0291302 | A1 | 12/2006 | Seto et al. |
| 2007/0126474 | A1 | 6/2007 | Chang et al. |
| 2007/0252617 | A1 | 11/2007 | Lewis et al. |
| 2007/0256038 | A1 | 11/2007 | Manohar |
| 2008/0168407 | A1 | 7/2008 | Manohar |
| 2009/0153188 | A1 | 6/2009 | Vorbach et al. |
| 2009/0289660 | A1 | 11/2009 | Ngai et al. |

OTHER PUBLICATIONS

U.S. Appl. No. 12/417,010, filed Apr. 2, 2009, Young.
U.S. Appl. No. 12/417,012, filed Apr. 2, 2009, Young.
U.S. Appl. No. 12/417,046, filed Apr. 2, 2009, Young et al.
U.S. Appl. No. 12/417,048, filed Apr. 2, 2009, Young et al.
U.S. Appl. No. 12/417,051, filed Apr. 2, 2009, Young et al.
Achronix Semiconductor Corp., *Introduction to Achronix FPGAs*, WP001 Rev. 1.6, Aug. 7, 2008, pp. 1-7, available from Achronix Semiconductor Corp., San Jose, California, USA.
Achronix Semiconductor Corp., *Speedster FPGA Family*, PB001 v3.5, copyright 2008, pp. 1-2, available from Achronix Semiconductor Corp., San Jose, California, USA.
Asato, Creighton et al., "A Data-Path Multiplier with Automatic Insertion of Pipeline Stages," *IEEE Journal of Solid-State Circuits*, Apr. 1990, pp. 383-387, vol. 25, No. 2.
Borriello, F. et al., "The Triptych FPGA Architecture " *IEEE Transactions on Very Large Scale Integration (VLSI) Systems*, Dec. 1990, pp. 491-501, vol. 3, No. 4.
Callaway, Thomas K., "Optimizing Arithmetic Elements for Signal Processing," *Proc. of the 1992 Workshop on VLSI Signal Processing*, Oct. 28-30, 1992, vol. V, pp. 91-100, Napa Valley, California, USA.
Eker, Johan et al., *CAL Language Report*, ERL Technical Memo UCB/ERL M03/48, Dec. 1, 2003, pp. 1-112, University of California at Berkeley, Berkeley, California, USA.
Habibi, I. et al., "Fast Multipliers," *IEEE Transactions on Computers*, Feb. 1970, pp. 153-157, vol. C-19, Issue 2.
Halfhill, Tom, "Ambric's New Parallel Processor," *Microprocessor Report*, Oct. 10, 2006, pp. 1-9, available from In-Stat, 2055 Gateway Place, San Jose, California, USA, or http;//www.mpronline.com.
Hauck, Scott et al., "Montage: An FPGA for Synchronous and Asynchronous Circuits," *Field-Programmable Gate Arrays: Architecture and Tools for Rapid Prototyping*, 1999, pp. 44-51, publ. by Springer Verlag, Berlin, Germany.
Hauck, Scott et al., "An FPGA for Implementing Asynchronous Circuits," *IEEE Design and Test of Computers*, Fall 1994, pp. 60-69, vol. 11, No. 3.
Hauck, Scott, "Asynchronous Design Methodologies: An Overview," *Proc. of the IEEE*, Jan. 1995, pp 69-93, vol. 83, No. 1.
Hauser, John, *The Garp Architecture*, Oct. 1997, pp. 1-56, University of California at Berkeley, USA.
Huang, Randy, *Hardware-Assisted Fast Routing for Runtime Reconfigurable Computing*, Fall 2004, pp. 1-43, dissertation submitted to University of California at Berkeley, USA.
Jain, Surendra K. et al., "Efficient Semisystolic Architectures for Finite-Field Arithmetic," *IEEE Transactions on Very Large Scale Integration (VLSI) Systems*, Mar. 1998, pp. 101-113, vol. 6, No. 1.
Maden, B. et al., "Parallel Architectures for High Speed Multipliers," *Proc. of the 1989 IEEE International Symposium on Circuits and Systems*, May 8-11, 1989, pp. 142-145, Portland, Oregon.
Martin, Alain et al., "The Design of an Asynchronous Microprocessor, " *Proc. Decennial Caltech Conference on VLSI*, Mar. 20-22, 1989, pp. 1-23.
Meier, Pascal C. H. et al., "Exploring Multiplier Architecture and Layout for Low Power, " *Proc. of the 1996 IEEE Custom Integrated Circuits Conference*, May 5-8, 1996, pp. 513-516.
Muhammad, Khurram et al., "Switching Characteristics of Generalized Array Multiplier Architectures and their Applications to Low Power Design, " *Proc. of the 1999 IEEE International Conference on Computer Design*, Oct. 10-13, 1999, pp. 230-235, Austin, Texas, USA.
Panato, Alex et al., "Design of Very Deep Pipelined Multipliers for FPGAs," *Proc. of the Design, Automation and Test in Europe Conference and Exhibition Designers' Forum*, Feb. 16-20, 2004, pp. 52-57, vol. 3, Paris, France.
Payne, R., "Asynchronous FPGA Architecture," *IEE Proc.-Comput. Digit. Tech.*, Sep. 1996, pp. 282-286, vol. 143, No. 5.
Pearce, R. C. et al., "Asynchronous Arbiter Module," *IEEE Transactions on Computers*, Sep. 1975, pp. 931-932, vol. 24, No. 9, IEEE Computer Society, Washington, DC, USA.
Sparso, J., *Asynchronous Circuit Design—A Tutorial*, copyright 2006, pp. 1-179, available from the Technical University of Denmark, Kgs. Lyngby, Denmark.
Teifel, John et al., "Highly Pipelined Asynchronous FPGAs," *Proc. of the 2004 ACM-SIGDA International Symposium on Field Programmable Gate Arrays*, Feb. 22-24, 2004, pp. 133-142, Monterey, California, USA.
Teifel, John et al., "An Asynchronous Dataflow FGPA Architecture," *IEEE Transactions on Computers*, Nov. 2004, pp. 1376-1392, vol. 53, No. 11, IEEE Computer Society, Washington, DC, USA.
Tsu, William et al., "High-Speed, Hierarchical Synchronous Reconfigurable Array, " *Proc. of the 1999 ACM/SIGDA 7th International Symposium on Field Programmable Gate Arrays*, Feb. 21-23, 1999, pp. 125-134, Monterey, California, USA.
Wikipedia, "C-element," downloaded Jul. 17, 2008 from http://en.wikipedia.org/C-element, pp. 1-2.
Xilinx, Inc., "XtremeDSP Design Considerations," *DSP: Designing for Optimal Results*, Chapter 2, Mar. 2005, Edition 1.0, pp. 5-52 (50 pages total), available from Xilinx, Inc., San Jose, California, USA.

Xilinx, Inc., "DSP48 Slice Math Functions," *DSP: Designing for Optimal Results*, Chapter 3, Mar. 2005, Edition 1.0, pp. 53-62 (12 pages total), available from Xilinx, Inc., San Jose, California, USA.

Xilinx, Inc., "DSP48E Description and Specifics," *Virtex-5 FPGA XtremeDSP Design Considerations*, Chapter 1, UG193 (v3.3), rev. Jan. 12, 2009, first release Apr. 14, 2006, pp. 15-47 (36 pages total), available from Xilinx, Inc., San Jose, California, USA.

Ye, A. et al., "Measuring and utilising the correlation between signal connectivity and signal positioning for FPGAs containing multi-bit building blocks," *IEE Proc.-Comput. Digit. Tech.*, May 2006, pp. 146-156, vol. 153, No. 3.

Ye, Andy et al., "Using Bus-Based Connections to Improve Field-Programmable Gate-Array Density for Implementing Datapath Circuits," *IEEE Transactions on Very Large Scale Integrations (VLSI) Systems*, May 2006, pp. 462-473, vol. 14, No. 5.

\* cited by examiner

| State | Sack | Iack | Vsend | Osend | Vdata | Odata |
|---|---|---|---|---|---|---|
| A | 0 | 0 | 0 | 0 | x | x |
| B | 1 | 0 | 1 | 1 | 0 | 0 |
| C | 1 | 0 | 1 | 1 | 1 | Idata |
| D | 0 | 0 | 0 | 0 | x | x |
| E | 1 | 0 | 1 | 1 | 1 | Idata |
| F | 0 | 1 | 0 | 0 | x | x |

ASYNCHRONOUS COMMUNICATION NETWORK AND METHODS OF ENABLING THE ASYNCHRONOUS COMMUNICATION OF DATA IN AN INTEGRATED CIRCUIT

FIELD OF THE INVENTION

The present application relates to integrated circuits, and more particularly to an asynchronous communication network in an integrated circuit and to methods of enabling the asynchronous communication of data in an integrated circuit.

BACKGROUND

Data may be communicated in an integrated circuit according to a variety of protocols. One common way of communicating data in an integrated circuit device is by using synchronous communication. Synchronous communication generally requires using at least one clock signal which is routed to circuit elements of an integrated circuit to enable the communication of data synchronously with the clock signal. However, synchronous communication has a number of drawbacks. In addition to the requirement for a clock circuit network, clock skew may cause problems in implementing the circuit. Additional circuits are often required to address clock skew to ensure that the integrated circuit operates properly. Further, because portions of a circuit may operate at different frequencies, multiple clock signals must be accommodated.

Another method of communicating data in an integrated circuit is by using asynchronous communication, where data is transferred within a circuit without the use of a clock signal. While many different protocols are available for enabling asynchronous communication, conventional protocols are data-driven, and are therefore used to construct deterministic systems. However, deterministic systems are difficult to implement for real-time systems that must react to events from many sources, where the arrival time, ordering and statistical distribution of data is unpredictable.

SUMMARY

An asynchronous communication network in an integrated circuit is disclosed. The asynchronous communication network comprises a plurality of circuit elements enabling the transmission of tokens, each circuit element having a component interface comprising: a routing network coupled to a first adjacent circuit element of the plurality of circuit elements; and a control circuit coupled to the routing network, the control circuit having a first input coupled to receive a first command requesting a detection of a token received at a second input of the control circuit, and a first acknowledgement output coupling a first acknowledgement signal indicating whether the first command is received at the first input.

A method enabling asynchronous communication in an integrated circuit is also disclosed. The method comprises providing a plurality of circuit elements which are coupled to communicate asynchronously; receiving, at a first input of a circuit element of the plurality of circuit elements, a first command from a first adjacent circuit element requesting a detection of a token received at a second input of the circuit element; and determining whether a token is received at the second input of the circuit element.

According to an alternate embodiment, a method of enabling asynchronous communication in an integrated circuit comprises providing a plurality of circuit elements which are coupled to communicate asynchronously; receiving, at a first input of a circuit element of the plurality of circuit elements, a command requesting a detection of the token received at a second input of the circuit element; determining whether a token is present at the second input of the circuit element; and determining whether to consume a token based upon the command.

DETAILED DESCRIPTION

Figure 1:
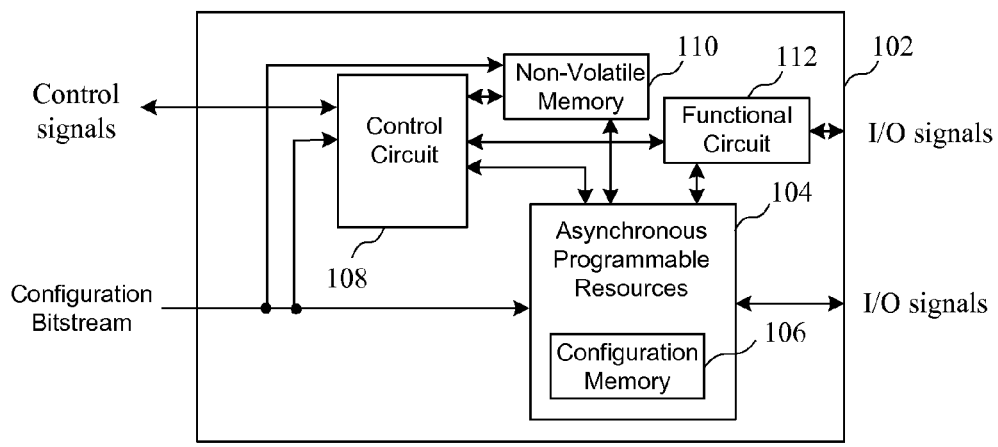
FIG. 1 is a block diagram of an integrated circuit having an asynchronous communication network according to an embodiment the present invention.

Turning first to FIG. 1, a block diagram of an integrated circuit having an asynchronous communication network is shown. In particular, an integrated circuit 102 comprises asynchronous programmable resources 104 having configuration memory 106. A control circuit 108 is coupled to the asynchronous programmable resources 104, as well as non-volatile memory 110 and a functional circuit 112. As will be described in more detail below, the various elements of the integrated circuit 102 enable the asynchronous programmable resources 104 to provide the asynchronous communication of data according to a configuration bitstream received by the integrated circuit 102. Various control signals and input/output (I/O) signals are communicated with the integrated circuit as shown in FIG. 1.

In operation, a configuration bitstream is coupled to the integrated circuit to program or configure the asynchronous programmable resources 104 of the integrated circuit. The configuration bitstream may be provided directly to the configuration memory 106, or indirectly by way of the control circuit 108 or the non-volatile memory 110. The control circuit 108 may be used to enable the transfer of the configuration bitstream to the configuration memory 106. The control circuit 108 may operate under the control of control signals provided to the integrated circuit. The control circuit may comprise a processor implemented in hard logic or in other programmable resources of the integrated circuit, for example.

While the asynchronous programmable resources may be implemented in any type of integrated circuit device, such as an application specific integrated circuit (ASIC) having a portion of the integrated circuit implemented as programmable resources, the asynchronous programmable resources may be implemented in other devices such as Field Programmable Gate Arrays (FPGAs) or Complex Programmable Logic Devices (CPLDs) which comprise significant portions of dedicated programmable resources. Programmable resources enable an integrated circuit device to be designed so that users may implement circuit designs of their choices. As will be described in more detail below, the programmable resources may comprise any type of programmable element.

Moreover, portions of the integrated circuit may be implemented as a hardwired core, a soft core, or a combination of a hardwired core and a soft core. A soft core is instantiated in programmable circuits after manufacture of an integrated circuit, whereas a hardwired core is manufactured as part of an integrated circuit. Furthermore, a hardwired core is conventionally thought of as having generally dedicated logic blocks, interconnects, and inputs/outputs, even though a portion of a hardwired core may be set to operate responsive to register settings or other storage. As will be described in more detail below, a function block of various embodiments of the present invention may be programmable and implemented as a hardwired core, a soft core, or a combination of a hardwired core and a soft core.

The functionality of an integrated circuit having programmable resources is controlled by configuration data bits of a configuration bitstream provided to the integrated circuit. The configuration bitstream comprises information related to the placement of blocks, and therefore comprises a placement configuration for the circuit implemented in a particular integrated circuit device. Accordingly, the configuration data may not only be used to enable the routing of signals between circuit elements of the integrated circuit, but also for configuring the circuit elements.

The configuration data bits may be stored in volatile memory such as static memory cells, in non-volatile memory such as flash memory, or in any other type of memory cell internal or external to the integrated circuit. While the various elements coupled to the asynchronous programmable resources 104 of FIG. 1 are shown as part of the integrated circuit 102, some or all of the elements may be implemented in one or more integrated circuits other than an integrated circuit having the asynchronous programmable resources 104.

While conventional asynchronous architectures are clockless, their computational elements are strictly data-driven. In data-driven asynchronous architectures, it is difficult to implement circuits based on a non-deterministic model of computation. In a non-deterministic model of computation, firing choices must be made between several courses of action that consume non-overlapping sets of input data. The circuit elements according to the present invention introduce timing-dependent behavior into an otherwise data-driven system in a disciplined manner.

As will be described in more detail below, a circuit element of the present invention enables non-deterministic control decisions in a data-driven implementation of the integrated circuit. According to one aspect of the invention, the circuit element enables implementing a non-deterministic control element with little overhead. The circuit element enables testing for the presence of a data token on an input without disturbing the data token. More particularly, the circuit element of the present invention enables testing for the presence of a token on one input port under the control of an input at a second input port. Accordingly, the control element may be used to test for the existence of tokens at its input, determine the value of a token that is present without consuming that token, and allow selective consumption or reuse of that token as dictated by a user-programmable circuit.

This testing feature enables an efficient implementation of a non-deterministic model of computation that would be difficult to implement using conventional devices. The ability to determine the value of a token without consuming it, and the ability to selectively consume a token being sampled provide significant advantages. For example, the embodiments of the present invention enable the implementation of guarded actions in actor/dataflow networks. An example of an actor/dataflow network is the CAL network, which is described in the "CAL Language Report," by Johan Eker and Jom W. Janneck, published in December 2003 in the Technical Memo UCB/ERL M03/48, Electronics Research Lab, University of California at Berkeley.

Figure 2:
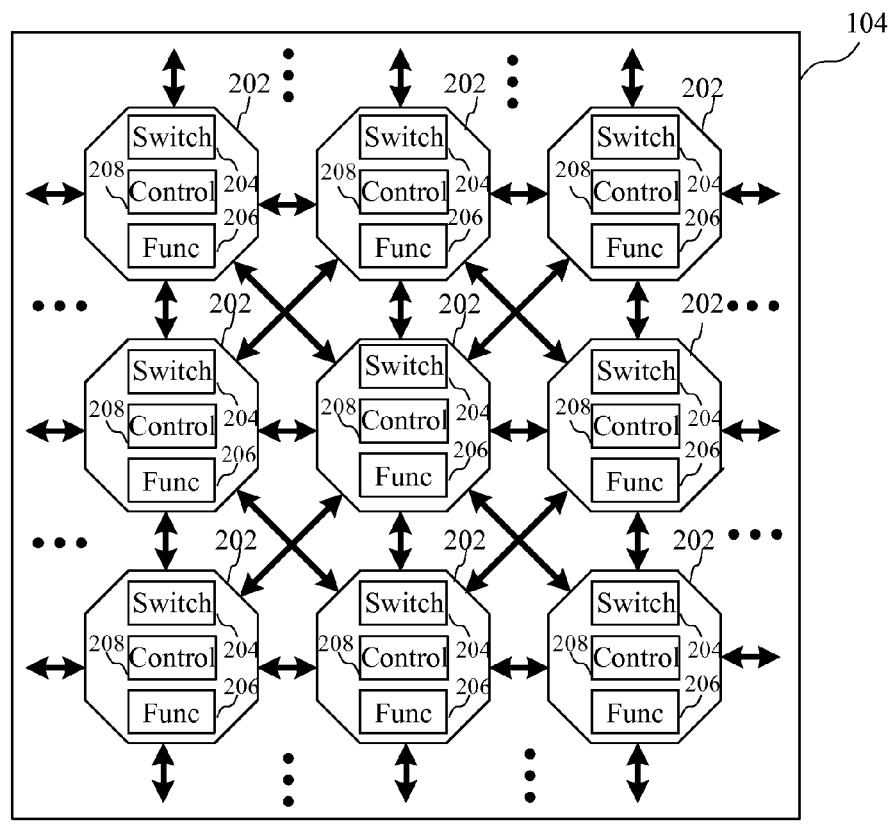
FIG. 2 is a block diagram of the asynchronous programmable resources of FIG. 1 according to an embodiment of the present invention.

The asynchronous programmable resources which enable the non-deterministic control of data will now be described in more detail. As shown in FIG. 2, a block diagram of the asynchronous programmable resources 104 includes a plurality of circuit elements 202. The asynchronous programmable resources of the circuit elements 202 are interconnected and enable the asynchronous communication of data in the integrated circuit. Each circuit element 202 comprises a switching block 204, a function block 206, and a control block 208. The switching block 204 enables the selection of input data from an adjacent circuit element 202 or an output of the function block 206 associated with the circuit element. As will be described in more detail below, data selected by the switch 204 may be operated on by the function block 206. The control block 208 enables the asynchronous communication of data in the integrated circuit. While an "octagonal" arrangement of circuit elements enables eight circuit elements to be adjacent to any given circuit element, other arrangements of greater or fewer adjacent circuit elements for a given circuit element could be employed. Further, while each circuit element as shown is coupled with circuit elements which are physically adjacent, the circuit elements could be configured to communicate with circuit elements which are separated by one or more circuit elements using longer interconnect lines.

Figure 3:
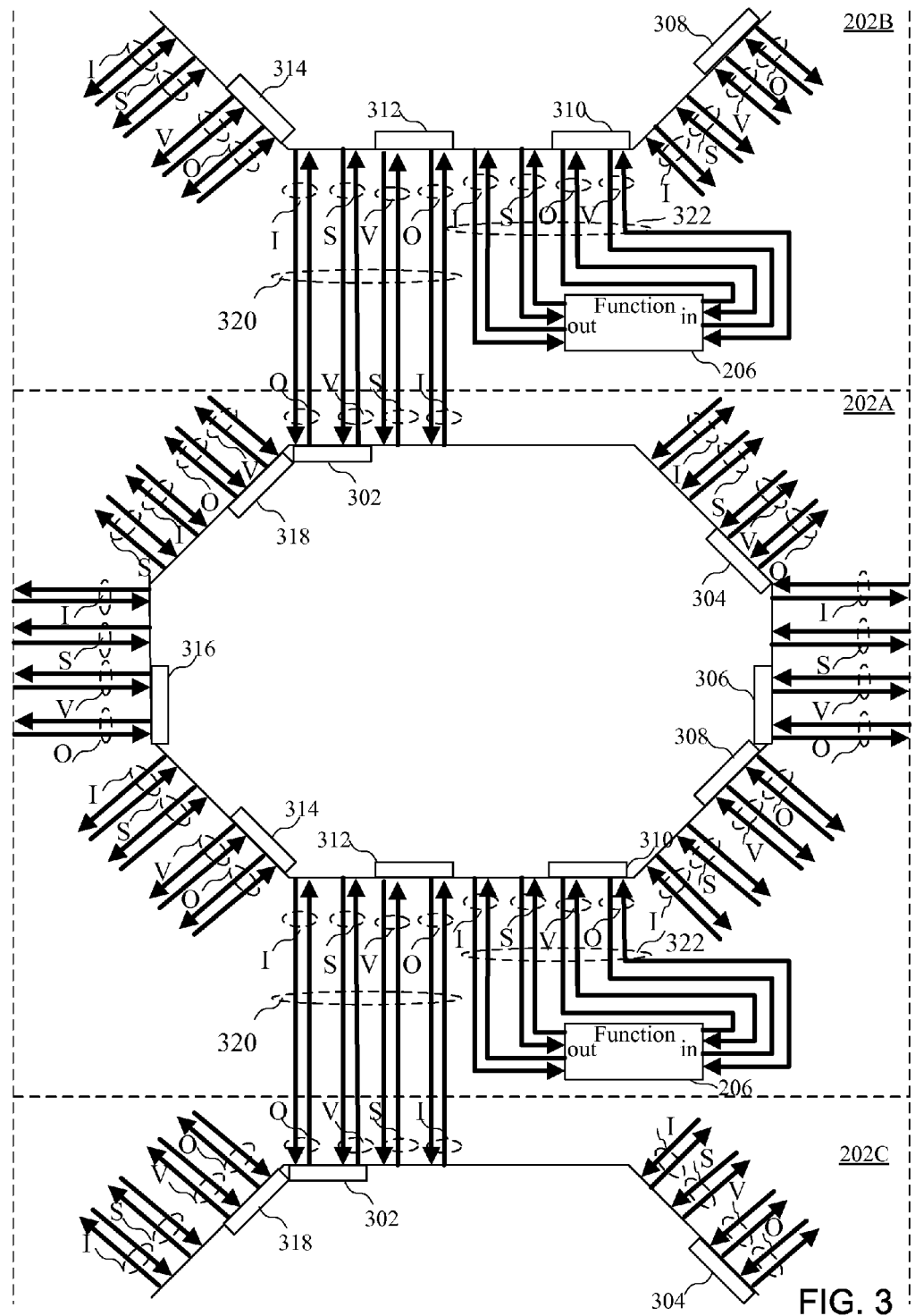
FIG. 3 is a block diagram of a circuit element coupled to two adjacent circuit elements according to an embodiment of the present invention.

Turning now to FIG. 3, a block diagram shows a circuit element comprising a programmable asynchronous block coupled to programmable asynchronous blocks in two adjacent circuit elements. In particular, a circuit element 202A is coupled to a first adjacent circuit element 202B above the circuit element 202A and a second adjacent circuit element 202C below the circuit element 202A. Component interfaces 302-318 on the output ports of the circuit element of FIG. 3 enable the selection and communication of data from a first adjacent component interface to either a second adjacent component interface or to a function block 206. As will be apparent in the description below, although the "O" and "V" ports receive acknowledge signals, they are generally considered output ports. Similarly, although the "I" and "S" ports generate acknowledge signals, they are generally considered input ports. Each component interface provides both the routing function of switch 204 and the control function of control block 208. Routing elements 320 between circuit elements and routing elements 322 associated with each function block 206 are also shown and will be described in more detail below.

As will be described in more detail in reference to FIG. 9 (which describes component interfaces 302-318, each component interface is associated with an output port and selects one input port of the group of input ports including each of the eight adjacent circuit elements and an output of the function block. In addition to component interfaces which route data to an adjacent circuit element, the component interface 310 of a given circuit element may route data received from an adjacent circuit element to the function block 206 of the given circuit element, where the function block performs an operation on the data. Some other component interface of the given circuit element may then select the output of the function block 206 to be routed to an adjacent circuit element.

Figure 4:
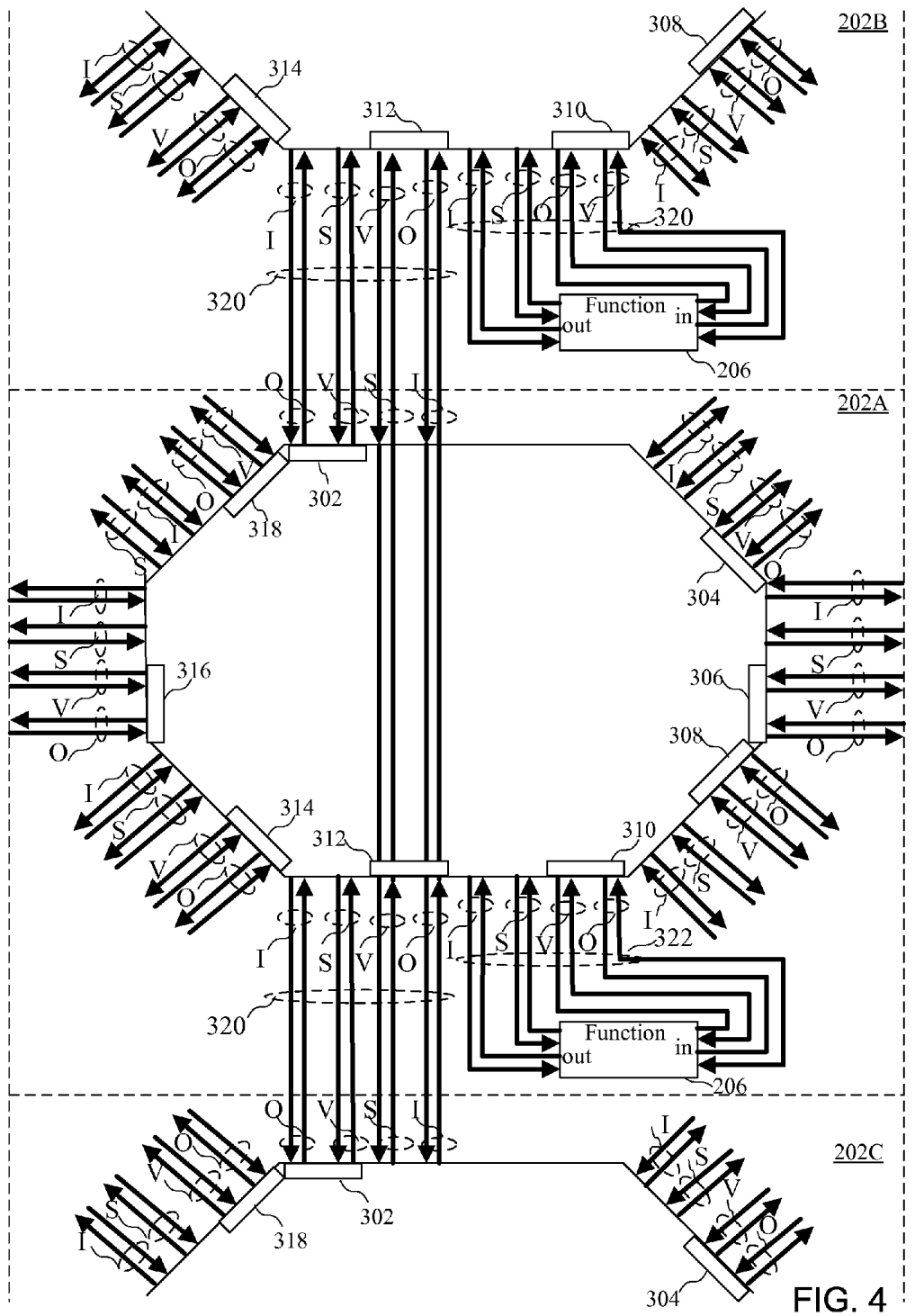
FIG. 4 is a block diagram showing a configuration of the circuit element 202A of FIG. 3 according to a first configuration.

According to the embodiment of FIG. 4, a first configuration shows that the component interface 312 on the bottom of the circuit element 202A enables the selection of the "I" and "S" ports from the adjacent circuit element 202B above the circuit element 202A. The data received by the component interface 312 is coupled to the "I" and "S" ports of another adjacent circuit element 202C. If the data routed by the component interface 312 were to be routed to a different adjacent circuit element, a different component interface of the circuit element 202A would route the data received at the I and S ports to a different adjacent element. Accordingly, the function block 206 of circuit element 202A is bypassed according to the configuration of FIG. 4.

It should be understood that, while routing elements 320 between circuit elements and routing elements 322 associated with each function block 206 are fixed, the component interfaces 302-318 of a given circuit element provide routing between selected "I" and "S" ports of an adjacent circuit element or outputs of the function block 206 and the "O" and "V" ports of the given circuit element. While the embodiment of FIG. 4 shows the selected "I" and "S" ports (which receives the outputs of "O" and "V" ports) associated with component interface 312 of circuit element 202B, the component interface 312 of circuit element 202A could have received outputs of "O" and "V" ports associated with a component interface of any of the other seven adjacent circuit elements. That is, the embodiment of FIG. 4 is provided to show the communication of data through the component interface 202A without using the function block 206. It should be further understood that, while one connection through the circuit element 202A by way of the component interface 312 is shown in FIG. 4, other component interfaces of the circuit element 202A could enable the communication of data through the circuit element 202A or with the function block 206 of the circuit element 202A.

Figure 5:
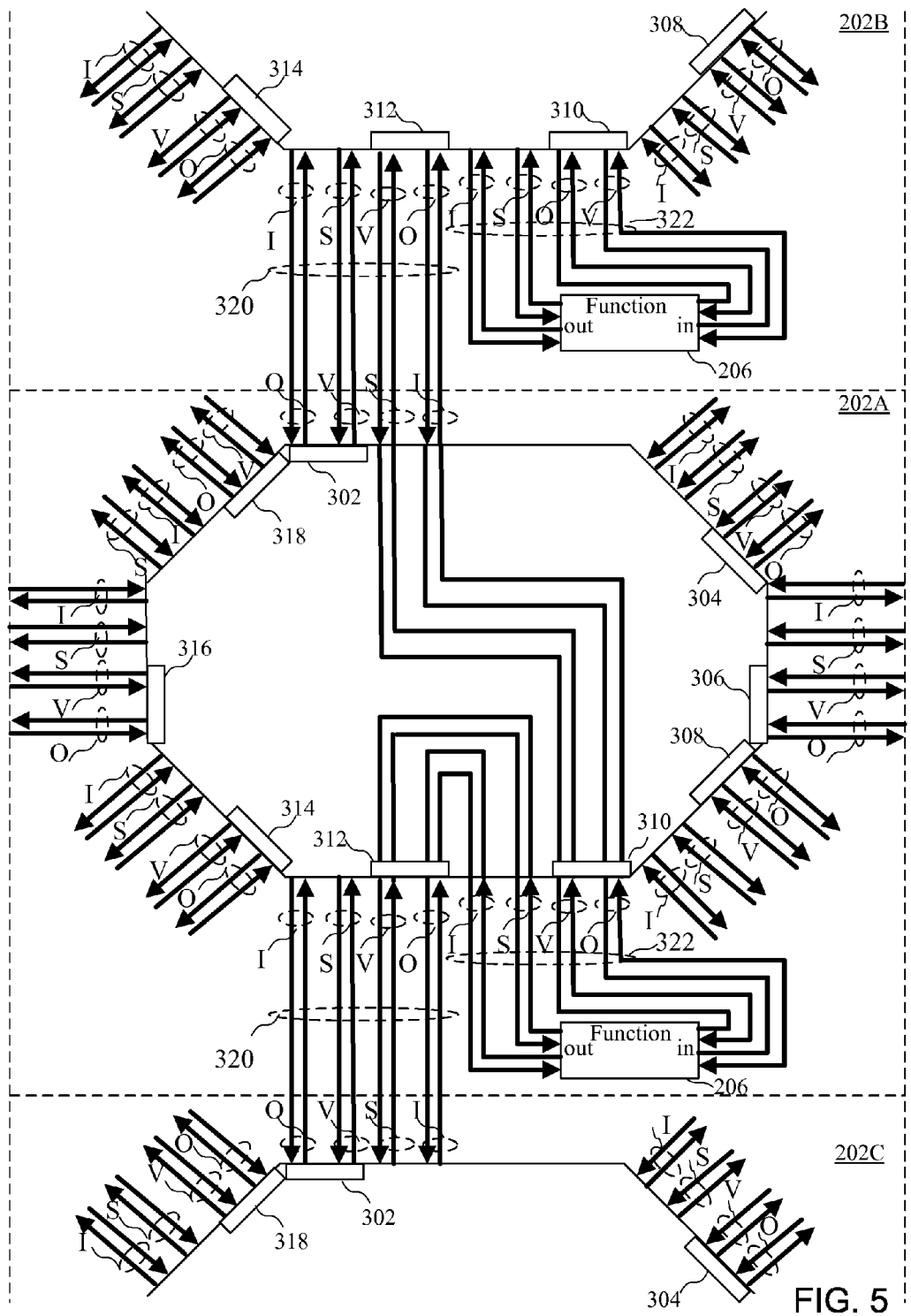
FIG. 5 is a block diagram showing a configuration of the circuit element 202A of FIG. 3 according to a second configuration.

In contrast to FIG. 4, a second configuration of FIG. 5 shows the coupling of the data at the "I" and "S" ports from the circuit element 202B to the function block 206 of circuit element 202A by the component interface 312 of circuit element 202B and component interface 310 of circuit element 202B. The output of the function block 206 is then routed to the circuit element 202C by the component interface 312. Accordingly, data received from the circuit element 202B and routed to circuit element 202C is operated on by the function block 206 of the circuit element 202A.

Figure 6:
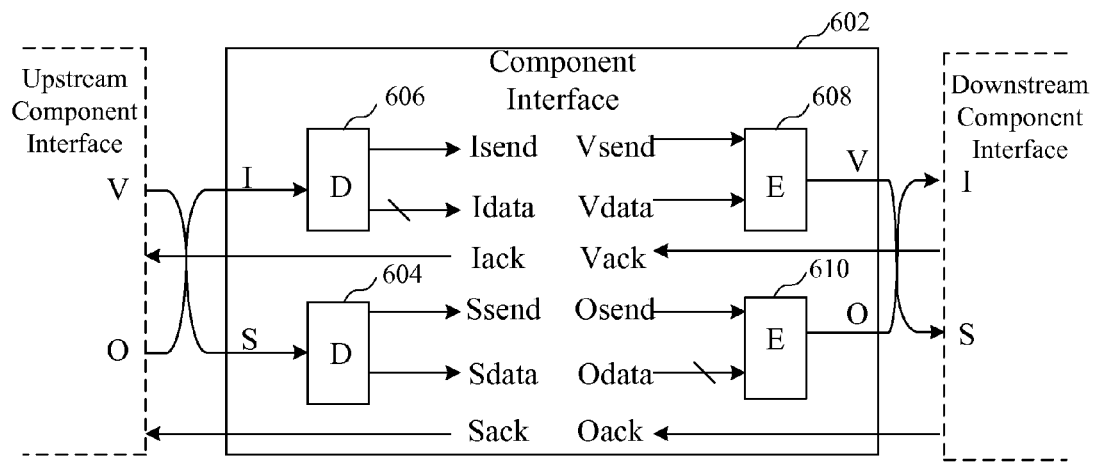
FIG. 6 is a block diagram of a component interface of a circuit element of FIGS. 3-5 according to an embodiment of the present invention.

Turning now to FIG. 6, the various signals and channels which enable the asynchronous transfer of data will be described. In particular, the block diagram of FIG. 6 shows a component interface 602, which could be the component interface 312 of the circuit element 202A of the embodiment of FIG. 4, for example. That is, according to the example of FIG. 6, the upstream component interface could be component interface 312 in circuit element 202B and the downstream component interface could be a component interface in circuit element 202C, for example. The component interface 602 comprises a first decoder 604 coupled to receive a sample request signal on the S port. When decoded, the sample request signal comprises an Ssend portion and an optional Sdata portion. As will be described in more detail below, the Ssend signal comprises a command requesting that the component interface 602 check data at the I port to determine whether there is valid input data on the I port. Input data at the I port is decoded by a decoder 606 to generate an Isend signal and an Idata signal. The Isend signal indicates whether valid data is present, while the Idata signal comprises the data being transmitted from the upstream component interface.

The component interface 602 also generates output signals. More particularly, after the component interface 602 receives a sample request from an "upstream" component interface, it provides a valid indication by way of the Vport to a downstream component interface. Accordingly, an encoder 608 encodes a Vsend signal which indicates that a sample request has been received by the component interface 602, and a Vdata signal which indicates whether a valid token is present at the I port. The component interface 312 also generates an output signal at the O port. In particular, a second encoder 608 encodes an Osend signal which indicates that data is being output, and an Odata signal which passes data which may be the Idata signal. One common method of encoding is to use two wires per bit so that invalid states exist in addition to a "valid 1" and "valid 0" state on each bit line. Any encoding scheme may be employed according to the present invention as long as it results in the ability to detect the presence or absence of a valid token, as will be described in more detail in reference to FIGS. 7 and 8.

The component interface 602 also generates and receives acknowledge signals. More particularly, the component interface 602 generates a sample acknowledge (Sack) signal indicating that a sample request was received at the S port and generates an input acknowledge (Iack) signal indicating that input data had been received at the I port. The component interface 602 also receives a valid acknowledge (Vack) signal indicating that the valid signal has been received at a downstream component interface by way of the V port, and an output acknowledge (Oack) signal indicating that an output signal has been received at the downstream component interface by way of the O port. As will be described in more detail in reference to FIGS. 9-11, the embodiments of the present invention enable the asynchronous transmission of data using a non-deterministic control element, and more particularly, enable the testing for the presence of a token on one input, the S input, under the control of a second input, the I input. As will also be described, the embodiments of the present invention enable the selective consumption of the token.

Figure 7:
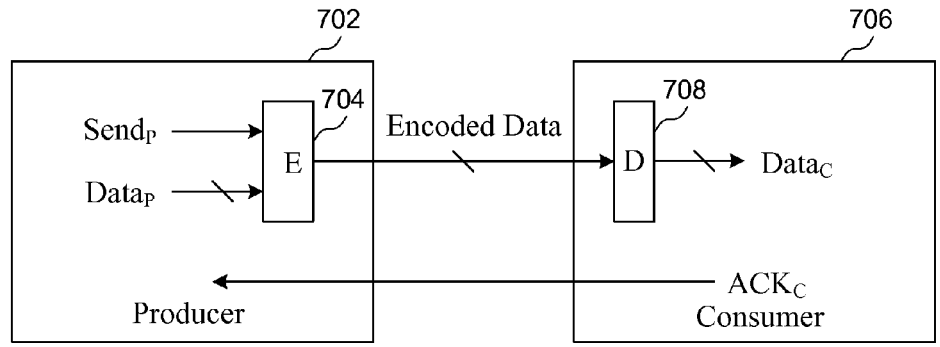
FIG. 7 is a bock diagram describing a two-phase protocol for enabling the asynchronous transfer of data by the circuit of FIG. 6 according to an embodiment of the present invention.
Figure 7:
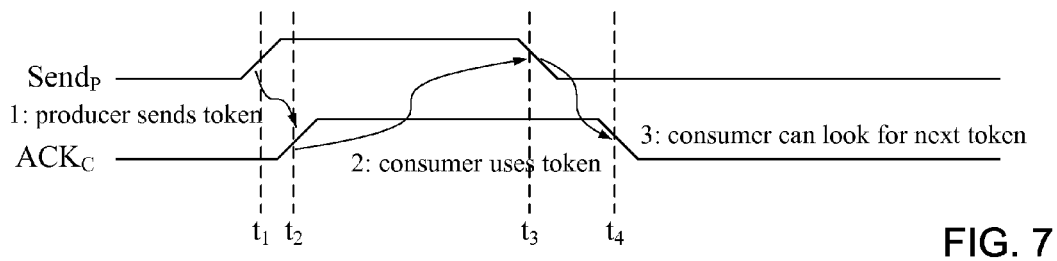

However, before describing the operation of a given component interface in more detail, it is beneficial to describe the generation of an acknowledge signal by one component interface and provided to another component interface. As shown in FIG. 7, a two-phase handshaking protocol is employed for generating an acknowledge signal by a component interface. Two component interfaces, referred to by way of example as a producer 702 having an encoder 704 and a consumer 706 having a decoder 708, are coupled to communicate data and corresponding acknowledge signals. That is, a producer provides data to a consumer, and the consumer provides an acknowledge signal in return. Because various producers and consumers in a circuit are connected by channels which may have arbitrary delays, it is necessary to provide a handshaking protocol to enable asynchronous communication. The example of FIGS. 7 and 8 could apply to the sample request signal received at the S port or the input data received at the I port.

According to the embodiment of FIG. 7, the producer provides a request signal Send$_P$ at a time $t_1$ as a part of an encoded data token to the consumer. After receiving the token, the consumer generates a consumer acknowledge signal ACK$_C$ at a time $t_2$, after which the consumer consumes the token. After the acknowledge signal is received by the producer, the producer resets the Send$_p$ signal at a time $t_3$. The consumer also sets the ACK$_C$ low at a time $t_4$, allowing the consumer to look for the next token. Accordingly, it is only necessary that the producer send a token and the consumer acknowledge receipt of the token to enable sending another token in an asynchronous communication network employing a two-phase handshaking protocol.

Figure 8:
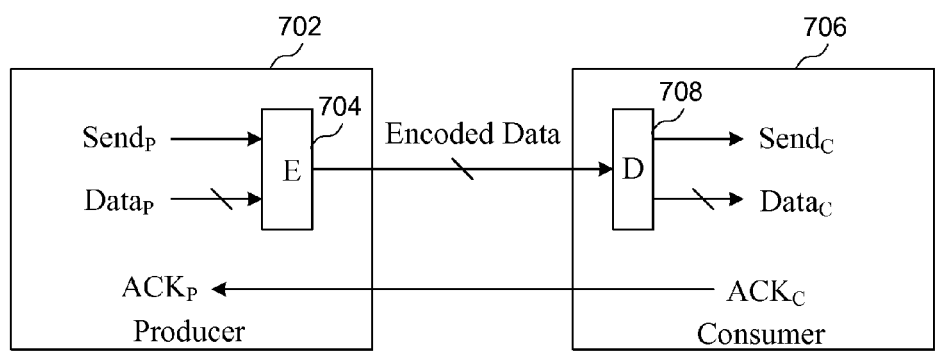
FIG. 8 is a bock diagram describing a four-phase protocol for enabling the asynchronous transfer of data by the circuit of FIG. 6 according to an embodiment of the present invention.
Figure 8:
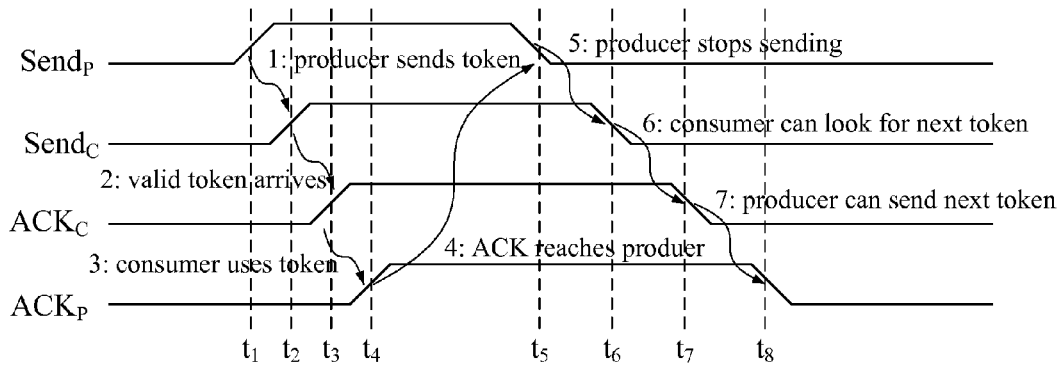

While the two-phase hand shaking protocol enables asynchronous communication, it requires more accurate timing requirements. Unless the delays can be carefully controlled to provide reliable asynchronous communication, it may be necessary to implement a four-phase asynchronous communication protocol. The four-phase asynchronous communication protocol of FIG. 8 is a generally more reliable communication protocol. In particular, a request signal Send$_P$ is generated when the producer sends a token at a time $t_1$, causing a Send$_C$ signal to go high at a time $t_2$ to indicate that the valid token has been received. An acknowledge signal ACK$_C$ is also generated after a valid token arrives as a part of the encoded data at the consumer at a time $t_3$. An acknowledge signal ACK$_P$ then goes high at a time $t_4$ after the acknowledge signal ACK$_C$ reaches the producer, indicating that the producer no longer needs to maintain the data. The ACK$_P$ signal also causes the Send$_P$ signal to go low at a time t5. The Send$_C$ signal then goes low in response to the Send$_P$ signal at a time $t_6$, enabling the consumer to look for the next token. The acknowledge ACK$_C$ signal goes low at a time $t_7$, enabling the producer to send the next token, and causing the ACK$_P$ signal to go low at a time $t_8$.

Although the requirement for the receipt of two separate acknowledge signals requires additional overhead to asynchronously communicate data, it also provides improved reliability in general and is more robust in the presence of uncertain wire delays. While the states of the various signals are shown as having an active high signal in the examples of FIGS. 7 and 8, it should be understood that the representation of the signals in these figures are shown by way of example, and inverted signals or signals having different timing relationships could be employed. FIGS. 7 and 8 show the signals necessary for implementing the two-phase and the four-phase asynchronous data protocol and the relationships between the signals. While the use of acknowledge signals is necessary to implement asynchronous communication according to the various embodiments of the present invention, different communication protocols for generating an acknowledge signal may be used. However, as will be described in more detail below in reference to FIG. 9, the use of a sample request channel for testing for the presence of a data token on an input channel enables the implementation of a non-deterministic asynchronous data communication system according to an embodiment of the invention.

Figure 9:
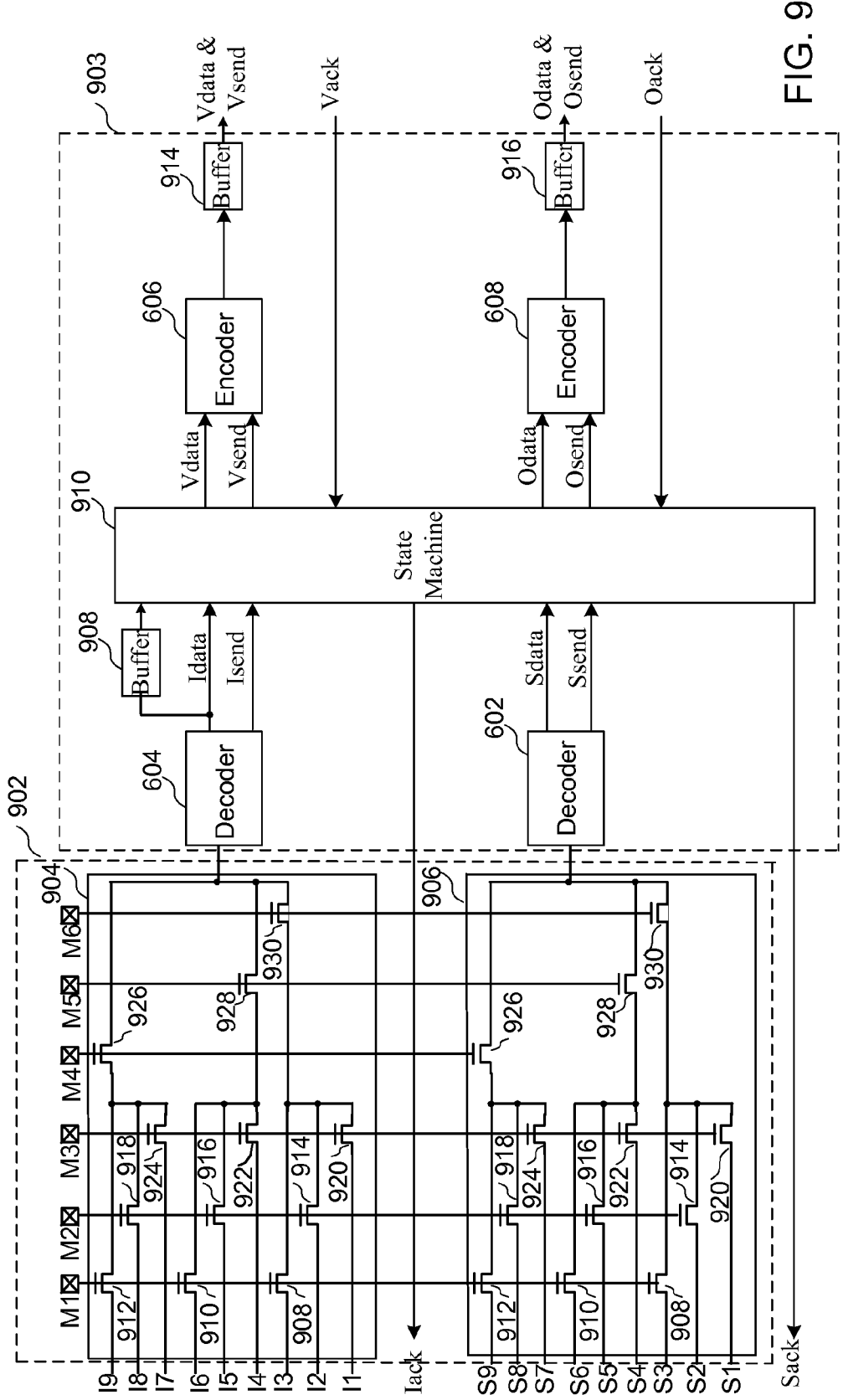
FIG. 9 is a block diagram of a component interface of a circuit element of FIGS. 3-5 according to an alternate embodiment of the present invention.

Turning now to FIG. 9, a block diagram of a component interface of a circuit element, such as circuit element 202A of FIG. 3, is shown. In particular, the circuit of FIG. 9 shows a multiplexing circuit 902 enabling the selection, for a given component interface, of the output of one of the eight adjacent component interfaces or the output of the function block 206 of the given component interface. The outputs of the multiplexing circuit 902 are coupled to a control circuit 903. Accordingly, the component interface of FIG. 9 would be implemented nine times, one for each component interface 302-318 of the circuit element 202A in the embodiment of FIG. 3, for example.

The multiplexing circuit 902 comprises an input data selection circuit 904 having a selection tree of transistors configured to select one of the input signals 11-19. Each transistor is controlled by one of a corresponding input signal associated with a memory element M1-M6. The memory elements may be set based upon configuration data which is downloaded to the integrated circuit, as described above in reference to devices having programmable resources.

In order to select one of the nine inputs 11-19, each of memory elements M1-M3 is used to select one input of three groups of inputs comprising groups 11-13, 14-16, and 17-19. In particular, M1 is used to the gates of transistors 908, 910 and 912 to select inputs 13, 16, and 19, respectively. Similarly, M2 is used to the gates of transistors 914, 916 and 918 to select inputs 12, 15, and 18, respectively. M3 is used to the gates of transistors 920, 922 and 924 to select inputs 13, 16, and 19, respectively. The remaining memory elements M4-M6 are used to select one of the three outputs selected by any given one of the memory elements M1-M3. More particularly, M4 is coupled to a gate of the transistor 926 to select the output of the group of inputs 17-19, M5 is coupled to a gate of the transistor 928 to select the output of the group of inputs 14-16, and M6 is coupled to a gate of the transistor 930 to select the output of the group of inputs 11-13. As can be seen in FIG. 9, a sample selection circuit 906 is similarly configured to select a corresponding sample signal S1-S9.

The outputs of the multiplexing circuit 902 are coupled to the control circuit 903. In particular, the Idata output generated by the decoder 604 is coupled to a buffer 908 and a state machine 910. The state machine 910 also receives the Isend signal generated by the decoder 604 and the Ssend and Sdata signals output by the decoder 602. The outputs of the state machine 910 are coupled to the encoder 606 and the encoder 608, which may be buffered by buffers 914 and 916, respectively. The component interface of FIG. 9 may be implemented in the component interfaces 302-318 of FIG. 3, for example.

Figures 10, 11:
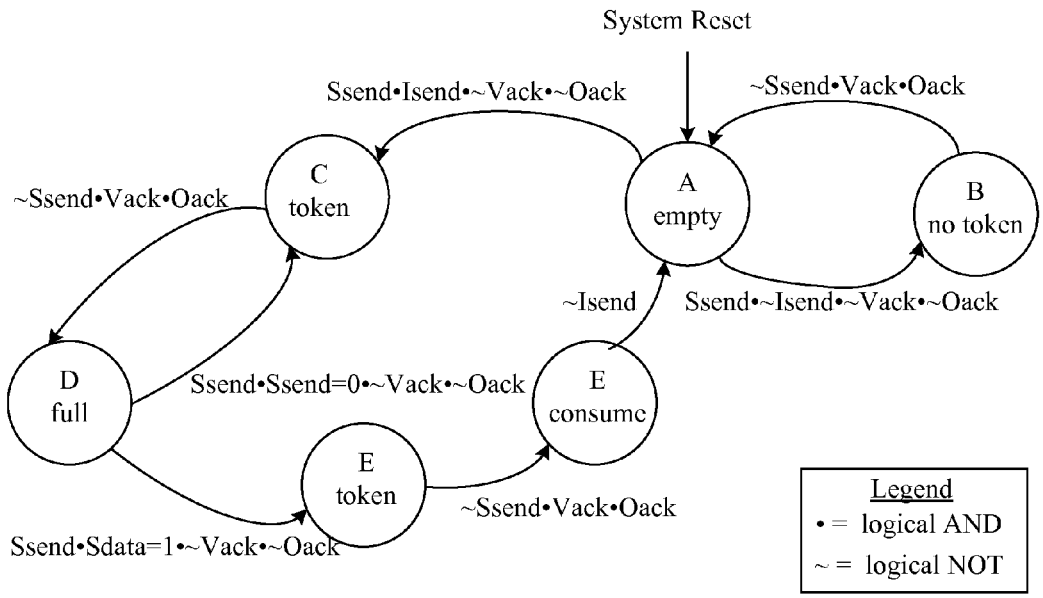
FIG. 10 is a state diagram showing the operation of the component interface of FIG. 9 according to an embodiment of the present invention.
FIG. 11 is a table showing the outputs for the various states of the state diagram of FIG. 10.

The operation of the state machine 910 will now be described in reference to FIGS. 10 and 11. Upon leaving system reset, the component interface is in a state A, which is an idle state, and no control outputs are asserted. When a sample request signal Ssend arrives at the S input of the component interface, the component interface transitions to a state B if there is no token at the I input. Otherwise, the component interface transitions to a state C if there is a token at the I input. In state B, an output token value 0 is produced on the V output to indicate the inactivity at the I input, and a zero data value is sent on the O output. According to an alternate embodiment, no data token would be sent on the O output when there is no token at the I input.

The system remains in either state B or C until the V and O tokens are acknowledged and Ssend is de-asserted. From state B, the component interface returns to state A when the V an O tokens are acknowledged to sample the input I again when requested. From state C, the component interface transitions to a state D, indicating that there is already a valid token waiting at the Idata input. The Idata of the token is presented as Odata at the O port for use by down-stream decision logic, and when a new sample request token arrives, the Idata must either be reused or consumed. If the S data is a logical "0", the Idata at the I port is not consumed, and the system transitions back to state C enabling reuse of the token. If the Sdata is a logical "1", the component interface transitions from state D to state E and the previously sampled Idata at the I port is consumed.

The component interface remains in state E until the V and O outputs have been acknowledged, and then transitions to state F to acknowledge the I port to finish the consumption of the Idata. After Isend is de-asserted, the component interface transitions back to state A to test for the availability of a new token. The various outputs of the component interface are shown in FIG. 11, where Vdata and Odata represent the output data corresponding to the various states of the state machine of FIG. 10.

According to one embodiment, the option to consume or not consume the input data being tested might be eliminated. This would result in a simpler circuit that either indicates the absence of an input data token when it receives a sample request, or consumes and copies the input data token if there is one when a sample request is received. In some applications, it might be advantageous to provide separate inputs to control the taking of samples and the consumption of previously sampled tokens. The use of separate inputs could be beneficial in situations where consumption could occur well before the system is ready to test for a new token, thereby releasing the producer driving the input to start working on a next token earlier. According to one embodiment, the buffer 908 could be implemented to provide a separate input to the state machine. According to another embodiment, it might be more useful not to generate an output data token if there is no input data token. The valid output token (V) of the upstream producer would then be used by a down-stream consumer to determine if the down-stream consumer should look for a token on the O port of the upstream producer. Input queues having buffers may also be provided at the input of FIG. 9 to enable the transfer of data sent in bursts. While data transmitted between a producer and a consumer using the circuits and methods of the present invention will be coordinated over time, short term variations in the transfer of data between a producer and a consumer may be handled by buffers. Such buffers would enable a producer to send groups of data. While the embodiments set forth above describe testing for the presence and value of a single token, more complicated networks may be implemented to enable multi-token testing using the circuit element as set forth above with other primitives, for example.

Figure 12:
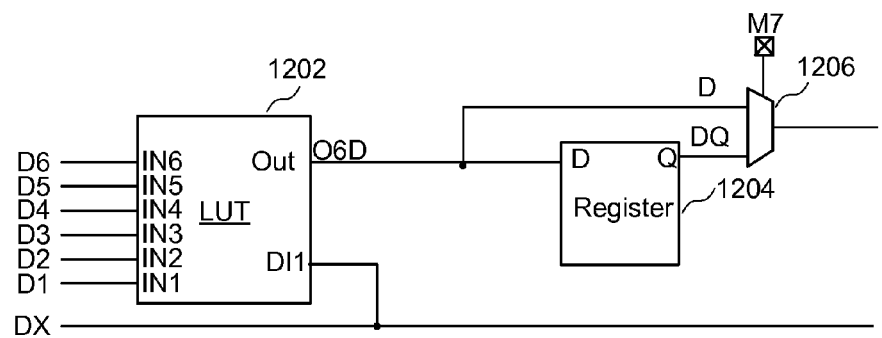
FIG. 12 is a block diagram of an exemplary function block 206 according to an embodiment of the present invention.

Turning now to FIG. 12, a block diagram of an exemplary function block 206 according to an embodiment of the present invention is shown. The exemplary function block of FIG. 12 comprises a lookup table 1202 coupled to receive input data D1-D6 and programming data DX. The output of the lookup table 1202 is coupled to a register 1204 or directly to a multiplexer 1206. The multiplexer 1206 is controlled by a control element M7 to select either the output of the lookup table 1204 or the registered output of the lookup table from register 1204. The function block of FIG. 12 is shown by way of example. The function block could instead comprise some other programmable function block, such as a digital signal processing (DSP) function block, for example. An example of a DSP block is a DSP48 block available from Xilinx, Inc., of San Jose, Calif. Further, while the function block is shown as being programmable, it should be understood that the functional block could also be implemented in fixed logic, where the programmable aspect of such an embodiment of the present invention would relate to the connection between various circuit elements 202.

Figure 13:
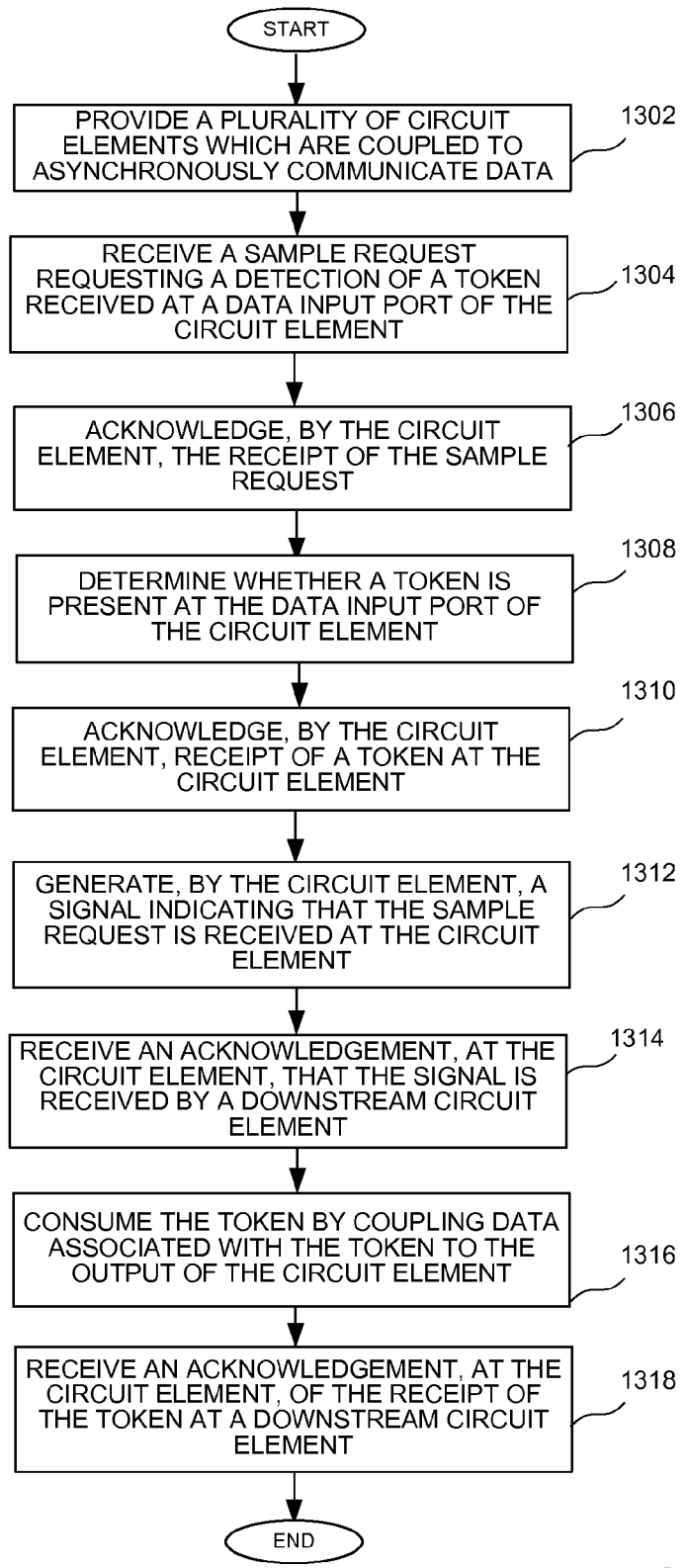
FIG. 13 is a flow chart showing a method of enabling the asynchronous communication of data according to an embodiment of the present invention.

Turning now to FIG. 13, a flow chart shows a method of enabling the asynchronous transmission of data according to an embodiment of the present invention. In particular, a plurality of circuit elements which is coupled to asynchronously communicate the data is provided at a step 1302. A sample request which requests a detection of a token received at a data input port of the circuit element is received at a step 1304. The receipt of the sample request is acknowledged by the circuit element at a step 1306. It is then determined whether a token is present at the data input port of the circuit element at a step 1308. Receipt of the token at the data input port of the circuit element is acknowledged by the circuit element at a step 1310. A signal indicating that the sample request is received at the circuit element is generated by the circuit element at a step 1312. An acknowledgement is received at the circuit element indicating that the signal is received by a downstream circuit element at a step 1314. The token is consumed by coupling data associated with the token to the output of the circuit element at a step 1316. An acknowledgement of receipt of the token at a downstream circuit element is received at the circuit element at a step 1318.

Figure 14:
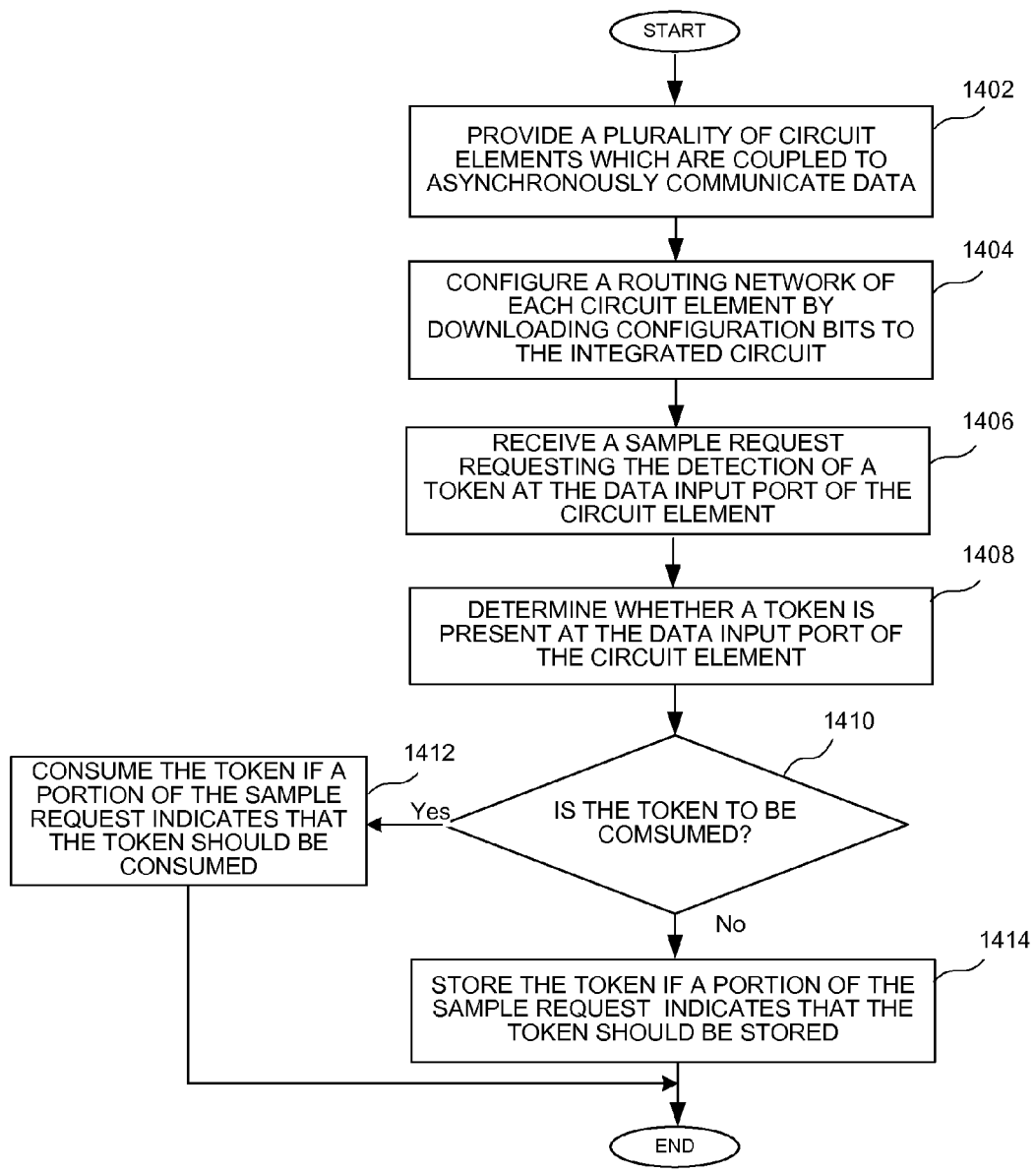
FIG. 14 is a flow chart showing a method of enabling the asynchronous communication of data according to an alternate embodiment of the present invention.

Turning now to FIG. 14, a flow chart shows a method of enabling the asynchronous transmission of data according to an alternate embodiment the present invention. A plurality of circuit elements which are coupled to asynchronously communicate the data is provided at a step 1402. A routing network of each circuit element is configured by downloading configuration bits to the integrated circuit at a step 1404. A sample request requesting the detection of a token at a data input port of the circuit element is received at a step 1406. After determining whether a token is present at the data input port of the circuit element at a step 1408, it is determined whether to consume the token based upon the sample request at a step 1410. The token is consumed if a portion of the sample request indicates that the token should be consumed at a step 1412. Otherwise, the token is stored if the portion of the sample request indicates that the token should be stored at a step 1414. The methods of FIGS. 13 and 14 may be implemented using the embodiments of FIGS. 1-12 as described, or other suitable embodiments.

It can therefore be appreciated that the new and novel asynchronous communication network and method of enabling the asynchronous communication of data has been described. It will be appreciated by those skilled in the art that numerous alternatives and equivalents will be seen to exist which incorporate the disclosed invention. As a result, the invention is not to be limited by the foregoing embodiments, but only by the following claims.

What is claimed is:

1. An asynchronous communication network in an integrated circuit, the asynchronous communication network comprising:
    a plurality of circuit elements enabling the transmission of tokens, each circuit element having a component interface comprising:
        a routing network coupled to a first adjacent circuit element of the plurality of circuit elements; and
        a control circuit coupled to the routing network, the control circuit having a first input coupled to receive a first command requesting a detection of a token received at a second input of the control circuit, and a first acknowledgement output coupling a first acknowledgement signal indicating whether the first command is received at the first input.

2. The asynchronous communication network of claim 1, wherein the first command comprises a portion indicating whether to consume the token.

3. The asynchronous communication network of claim 1, wherein the first acknowledgement signal is coupled to the component interface of the first adjacent circuit element.

4. The asynchronous communication network of claim 3, wherein each circuit element further comprises a second acknowledgement output coupling a second acknowledgement signal to the first adjacent circuit element, the second acknowledgement signal acknowledging receipt of the token at the second input.

5. The asynchronous communication network of claim 1, wherein each circuit element further comprises a first acknowledgement input coupled to receive a third acknowledgement signal from a second adjacent circuit element, the third acknowledgement signal indicating that a second command requesting a detection of the token, generated at a first output, is received at the second adjacent circuit element.

6. The asynchronous communication network of claim 5, wherein each circuit element further comprises a second output for coupling the token to the second adjacent circuit element.

7. The asynchronous communication network of claim 6, wherein each circuit element further comprises a second acknowledgement input for receiving a fourth acknowledgement signal indicating that the token coupled to the second adjacent circuit element was received.

8. A method enabling asynchronous communication in an integrated circuit, the method comprising:
   providing a plurality of circuit elements which are coupled to communicate asynchronously;
   receiving, at a first input of a circuit element of the plurality of circuit elements, a first command from a first adjacent circuit element requesting a detection of a token received at a second input of the circuit element; and
   determining whether a token is received at the second input of the circuit element.

9. The method of claim 8, further comprising generating a first acknowledgement signal, by the circuit element, indicating that the first command from the first adjacent circuit element is received.

10. The method of claim 9, further comprising generating a second acknowledgement signal, by the circuit element, indicating that the token was received at the second input of the circuit element.

11. The method of claim 8, further comprising coupling the token from the circuit element to a first input of a second adjacent circuit element.

12. The method of claim 11, further comprising receiving a first acknowledgement signal, at the circuit element, of receipt of the token at the first input of the second adjacent circuit element.

13. The method of claim 12, further comprising coupling a second command requesting a detection of the token at the first input of the second adjacent circuit element.

14. The method of claim 13, further comprising receiving a second acknowledgement signal, at the circuit element, that the second command is received by the second adjacent circuit element.

15. A method of enabling asynchronous communication in an integrated circuit, the method comprising:
   providing a plurality of circuit elements which are coupled to communicate asynchronously;
   receiving, at a first input of a circuit element of the plurality of circuit elements, a command requesting a detection of a token received at a second input of the circuit element;
   determining whether the token is present at the second input of the circuit element; and
   determining whether to consume the token based upon the command.

16. The method of claim 15, further comprising generating a first acknowledgement signal from the circuit element indicating that the command was received at the first input of the circuit element.

17. The method of claim 16, further comprising generating a second acknowledgement signal from the circuit element indicating that the token was received at the second input of the circuit element.

18. The method of claim 15, further comprising consuming the token if the command indicates that the token should be consumed.

19. The method of claim 15, further comprising storing the token if the command indicates that the token should be stored.

20. The method of claim 15, wherein providing a plurality of circuit elements which are coupled to communicate asynchronously comprises configuring circuit elements using configuration bits downloaded to the integrated circuit.

\* \* \* \* \*